(12) United States Patent
Sepe et al.

(10) Patent No.: US 7,694,094 B2
(45) Date of Patent: Apr. 6, 2010

(54) TRANSACTION METHOD FOR MANAGING THE STORING OF PERSISTENT DATA IN A TRANSACTION STACK

(75) Inventors: Paolo Sepe, Quarto (IT); Luca Di Cosmo, S. Angelo D'Alife (IT); Enrico Musella, Pozzuoli (IT)

(73) Assignee: Incard S.A., Geneva (CH)

( * ) Notice: Subject to any disclaimer, the term of this patent is extended or adjusted under 35 U.S.C. 154(b) by 433 days.

(21) Appl. No.: 11/771,307

(22) Filed: Jun. 29, 2007

(65) Prior Publication Data

US 2009/0013122 A1  Jan. 8, 2009

(30) Foreign Application Priority Data

Jun. 29, 2006  (EP)  .................................. 06013464

(51) Int. Cl.
*G06F 12/00* (2006.01)

(52) U.S. Cl. ........................ 711/162; 711/161; 711/129; 711/132; 711/E12.103; 707/202

(58) Field of Classification Search ........................ None
See application file for complete search history.

(56) References Cited

U.S. PATENT DOCUMENTS

| | | | | |
|---|---|---|---|---|
| 6,219,666 B1 | 4/2001 | Krishnaswamy et al. | ........ | 707/8 |
| 2005/0055498 A1 | 3/2005 | Beckert et al. | .............. | 711/104 |
| 2006/0015754 A1 | 1/2006 | Drehmel et al. | ............. | 713/193 |

FOREIGN PATENT DOCUMENTS

| | | |
|---|---|---|
| EP | 0838756 | 4/1998 |
| EP | 0964360 | 12/1999 |

*Primary Examiner*—Reginald G Bragdon
*Assistant Examiner*—Arvind Talukdar
(74) *Attorney, Agent, or Firm*—Lisa K. Jorgenson; Allen, Dyer, Doppelt, Milbrath & Gilchrist, P.A.

(57) ABSTRACT

A transaction method manages the storing of persistent data to be stored in at least one memory region of a non-volatile memory device before the execution of update operations that involve portions of the persistent data. Values of the persistent data are stored in a transaction stack that includes a plurality of transaction entries before the beginning of the update operations so that the memory regions involved in such an update are restored in a consistent state if an unexpected event occurs. A push extreme instruction reads from the memory cells a remaining portion of the persistent data that is not involved in the update operation, and stores the remaining portion in a subset of the transaction entries. The push extreme instruction is executed instead of a push instruction when the restoring of the portion of persistent data is not required after the unexpected event. The restoring corresponds to the values that the persistent data had before the beginning of the update operations.

28 Claims, 6 Drawing Sheets

| ADDRESS | LEN | INDEX |
|---|---|---|
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |

1) INITIAL STATE

FIG. 4a

| ADDRESS | LEN | INDEX |
|---|---|---|
| 00000000 | 00 | BEGIN ROOT |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |

2) BEGIN TRANSACTION

FIG. 4b

| ADDRESS | LEN | INDEX |
|---|---|---|
| 00000000 | 00 | BEGIN ROOT |
| 00910000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |

3.1) UPDATE (src,910000,2)

FIG. 4c

| ADDRESS | LEN | INDEX |
|---|---|---|
| 00000000 | 00 | BEGIN ROOT |
| 00910000 | 02 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |

3.2) UPDATE(src,910000,2)

FIG. 4d

| ADDRESS | LEN | INDEX |
|---|---|---|
| 00000000 | 00 | BEGIN ROOT |
| 00910000 | 02 | 01 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |

3.3) UPDATE(src,910000,2)

FIG. 4e

| ADDRESS | LEN | INDEX |
|---|---|---|
| 00000000 | 00 | BEGIN ROOT |
| 00910000 | 02 | 01 |
| 00910002 | 02 | 01 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |

4) UPDATE (src,910002,2)

FIG. 4f

| ADDRESS | LEN | INDEX |
|---|---|---|
| 00000000 | 00 | BEGIN ROOT |
| 00910000 | 02 | 01 |
| 00910002 | 02 | 01 |
| 00000041 | 03 | 02 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |
| 00000000 | 00 | 00 |

5) UPDATE(src,000041,3)

FIG. 4g

| ADDRESS | LEN | INDEX |
|---|---|---|
| 00000000 | 00 | BEGIN ROOT |
| 00910000 | 02 | 01 |
| 00910002 | 02 | 01 |
| 00000041 | 03 | 02 |
| 00000080 | 02 | 03 |
| 00000040 | 04 | 02 |
| 00000050 | 0A | 02 |
| 00000084 | 08 | 03 |
| 00000000 | 00 | 00 |
| 00000000 | 00 | 00 |
| 00000000 | 00 | 00 |
| 00000000 | 00 | 00 |

6) OTHER UPDATES

FIG. 4h

| ADDRESS | LEN | INDEX |
|---|---|---|
| 00000000 | 00 | BEGIN ROOT |
| 00910000 | 02 | 01 |
| 00910002 | 02 | 01 |
| 00000041 | 03 | 02 |
| 00000080 | 02 | 03 |
| 00000040 | 04 | 02 |
| 00000050 | 0A | 02 |
| 00000084 | 08 | 03 |
| 00000000 | 00 | COMMIT ROOT |
| 00000000 | 00 | 00 |
| 00000000 | 00 | 00 |
| 00000000 | 00 | 00 |

7.1) COMMIT TRANSACTION

FIG. 4i

| ADDRESS | LEN | INDEX |
|---|---|---|
| 00000000 | 00 | BEGIN ROOT |
| 00910000 | 02 | 01 |
| 00910002 | 02 | 01 |
| 00000041 | 03 | 02 |
| 00000080 | 02 | 03 |
| 00000040 | 04 | 02 |
| 00000050 | 0A | 02 |
| 00000084 | 08 | 03 |
| 00000000 | 00 | COMMIT ROOT |
| 00000000 | 00 | 03 |
| 00000000 | 00 | 00 |
| 00000000 | 00 | 00 |

7.2) COMMIT TRANSACTION

FIG. 4j

| ADDRESS | LEN | INDEX |
|---|---|---|
| 00000000 | 00 | BEGIN ROOT |
| 00910000 | 02 | FF |
| 00910002 | 02 | FF |
| 00000041 | 03 | FF |
| 00000080 | 02 | FF |
| 00000040 | 04 | FF |
| 00000050 | 0A | FF |
| 00000084 | 08 | FF |
| 00000000 | 00 | COMMIT ROOT |
| 00000000 | 00 | 03 |
| 00000000 | 00 | 00 |
| 00000000 | 00 | 00 |

7.3) COMMIT TRANSACTION

FIG. 4k

| ADDRESS | LEN | INDEX |
|---|---|---|
| 00000000 | 00 | FF |
| 00910000 | 02 | FF |
| 00910002 | 02 | FF |
| 00000041 | 03 | FF |
| 00000080 | 02 | FF |
| 00000040 | 04 | FF |
| 00000050 | 0A | FF |
| 00000084 | 08 | FF |
| 00000000 | 00 | COMMIT ROOT |
| 00000000 | 00 | 03 |
| 00000000 | 00 | 00 |
| 00000000 | 00 | 00 |

7.4) COMMIT TRANSACTION

FIG. 4l

| ADDRESS | LEN | INDEX |
|---|---|---|
| 00000000 | 00 | FF |
| 00910000 | 02 | FF |
| 00910002 | 02 | FF |
| 00000041 | 03 | FF |
| 00000080 | 02 | FF |
| 00000040 | 04 | FF |
| 00000050 | 0A | FF |
| 00000084 | 08 | FF |
| 00000000 | 00 | COMMIT ROOT |
| 00000000 | 00 | 03 |
| 00000000 | 00 | BEGIN ROOT |
| 00000000 | 00 | 00 |

8.1) BEGIN TRANSACTION

FIG. 4m

| ADDRESS | LEN | INDEX |
|---|---|---|
| 00000000 | 00 | FF |
| 00910000 | 02 | FF |
| 00910002 | 02 | FF |
| 00000041 | 03 | FF |
| 00000080 | 02 | FF |
| 00000040 | 04 | FF |
| 00000050 | 0A | FF |
| 00000084 | 08 | FF |
| 00000000 | 00 | FF |
| 00000000 | 00 | 03 |
| 00000000 | 00 | BEGIN ROOT |
| 00000000 | 00 | 00 |

8.2) BEGIN TRANSACTION

FIG. 4n

| ADDRESS | LEN | INDEX |
|---|---|---|
| 00000000 | 00 | FF |
| 00910000 | 02 | FF |
| 00910002 | 02 | FF |
| 00000041 | 03 | FF |
| 00000080 | 02 | FF |
| 00000040 | 04 | FF |
| 00000050 | 0A | FF |
| 00000084 | 08 | FF |
| 00000000 | 00 | FF |
| 00000000 | 00 | 03 |
| 00000000 | 00 | BEGIN ROOT |
| 00910000 | 02 | 04 |

9) UPDATE (src,910000,2)

FIG. 4o

| ADDRESS | LEN | INDEX |
|---|---|---|
| 00000000 | 00 | 00 |
| 00000000 | 00 | 00 |
| 00000000 | 00 | 00 |
| 00000000 | 00 | 00 |
| 00910080 | 02 | FF |
| 00910040 | 04 | FF |
| 00000050 | 0A | FF |
| 00000084 | 08 | FF |
| 00000000 | 00 | FF |
| 00000000 | 00 | 03 |
| 00000000 | 00 | BEGIN ROOT |
| 00910000 | 02 | 04 |

10.1) UPDATE (src,910081,4)

FIG. 4p

| ADDRESS | LEN | INDEX |
|---|---|---|
| 00910081 | 04 | 05 |
| 00000000 | 00 | 00 |
| 00000000 | 00 | 00 |
| 00000000 | 00 | 00 |
| 00910080 | 02 | FF |
| 00910040 | 04 | FF |
| 00000050 | 0A | FF |
| 00000084 | 08 | FF |
| 00000000 | 00 | FF |
| 00000000 | 00 | 03 |
| 00000000 | 00 | BEGIN ROOT |
| 00910000 | 02 | 04 |

10.2) UPDATE (src,910081,4)

FIG. 4q

| ADDRESS | LENGTH | INDEX | | BACKUP DATA |
|---|---|---|---|---|
| 0x00000000 | 0x00 | BEGIN | 1 | 8888888888888888 |
| 0x00091010 | 0x02 | 0x01 | 2 | 9999999999999999 |
| 0x00091016 | 0x04 | 0x01 | 3 | 1138888888882222 |
| 0x00091012 | 0x81 | 0xFF | 4 | |
| 0x00091022 | 0x04 | 0x02 | 5 | |
| 0x00091014 | 0x02 | 0x03 | 6 | |
| | | | 7 | |

EEP DATA INITIAL STATE

| | |
|---|---|
| 0x91000 | |
| 0x91010 | 8888888888888888 |
| 0x91020 | 9999999999999999 |

```
BEGIN TRANSACTION();
UPDATE(src, 0x91010, 0x2 );       (src VALUE ARE '1')
UPDATE(src, 0x91016, 0x4 );       (src VALUE ARE '2')
UPDATENONATOMIC( src, 0x91012, 0x1);  (src VALUE IS '3')
UPDATE(src,0x91022, 0x4 );        (src VALUE ARE '4')
UPDATE(src,0x91014, 0x2 );        (src VALUE ARE '5')
<----POWER LOSS
```

FIG. 5

TRANSACTION METHOD FOR MANAGING THE STORING OF PERSISTENT DATA IN A TRANSACTION STACK

FIELD OF THE INVENTION

The present invention relates to the storing of persistent data in a non-volatile memory device. More particularly, the present invention relates to managing the storing of the persistent data in a transaction stack before the execution of at least one update operation that involves at least a portion of the persistent data.

BACKGROUND OF THE INVENTION

A non-volatile memory, such as a Flash memory or an EEPROM memory, is used in an electronic device to store non-volatile data. Such non-volatile data is also indicated as persistent data because its content may be variable during the programming phases of the electronic memory device, but its value must be preserved during the power off.

More particularly, the non-volatile memory ensures that the value of persistent data is not lost after a regular switch-off of the electronic device, i.e., when the electrical deactivation occurs in an idle state of the device. This is the typical case when the deactivation is driven by an operating system of a terminal that the device is connected to, or directly belongs to the electronic device.

If an accidental electrical deactivation occurs during an application execution, specifically during an updating operation of persistent data, it is possible that the value of persistent data is left in an inconsistent state. This could compromise, completely or partially, the functioning of the electronic device in the successive power-on sessions.

A prior art document, European patent no. 964,360, relates to a method for supplying power to integrated circuit cards comprising a microprocessor, a volatile memory (RAM) and a non-volatile memory (ROM, EEPROM) in case of an unexpected power off. This approach tries to overcome the above problem by always keeping the power supply to the memory device.

A second prior art document, U.S. published patent application no. 2005/0055498, relates to integrated circuit cards comprising failure protection for maintaining power in case of a power supply failure, and a power failure detector for sensing a corresponding power supply failure.

Those prior art documents disclose methods based on giving additional power to the electronic device for concluding sensitive operations before an unexpected switch off of the device. They do not consider a transaction method for storing persistent data in case of other unexpected events not determined by a power off.

A transaction method may restore the value of persistent data in a consistent state by generally grouping together an arbitrary number of writing operations, and establishing that they have to be considered as a single writing operation with respect to unexpected events comprising a power off. The arbitrary number of writing operations may be considered a "Secure Update" because the value of the persistent data they process are to be restored in a consistent state even if unexpected events occur.

More particularly, the transaction method marks all the writing operations involved in a "Secure Update" between first and second pseudo-instructions, respectively BeginTransaction and CommitTransaction, as schematically shown in FIG. 1.

In case of unexpected events during the execution of an operation included between the Begin Transaction and Commit Transaction, the values of the persistent data are restored in the non-volatile memory at the next device start-up to the value they had before the Begin Transaction instruction.

More particularly, the transaction method is based on a transaction stack, that is, a portion of non-volatile memory where the original value of persistent data involved in an update operation is stored before the starting of such an update. If an unexpected event occurs, the initial-consistent value of persistent data is retrieved from the transaction stack and restored in the non-volatile memory.

The non-volatile memory allows a limited number of writing accesses. Over this limit, the "data retention time" of the non-volatile memory decreases to values not acceptable for any application purpose. For example, the number of the allowed writing operations for EEPROM or Flash memories is typically in the range of 100,000 to 1,000,000.

This limitation has an impact on the implementation of the transaction method for driving the transaction stack, as any "Secure Update" involving a number of secure writing operations has the side effect of a further writing in the transaction stack. Moreover, depending on how the transaction method drives the storing of persistent data inside the transaction stack, different write operations may stress some bytes of the transaction stack more than others. In other words, different portions or bytes of the transaction stack could not be used uniformly.

The maximum number of writing operations on such particularly stressed bytes bounds the number of the "Secure updating" operations allowed to the applications on the non-volatile memory. Even if the device is guaranteed for 100,000 writing operations on each single byte of the non-volatile memory, the electronic device cannot perform more than 100,000 "Secure updating" even on different memory bytes. This is because in an opposite case, the bytes already stressed in the transaction stack could be damaged.

Moreover, current non-volatile memory devices, such as Flash memory devices and several EEPROM memory devices are based on a plurality of memory regions. Each memory region comprises a number of bits defining its granularity.

More particularly, it is nearly impossible to erase single bits within a memory region. The erasing of single or several bits within a memory region requires an erase of the whole region they belong to for granularity issues of the memory region. The same problem affects the updating operation because in such memories a writing operation first requires an erase operation to set the memory region in a "ready to be written" state.

When an unexpected event such as an accidental electrical power off occurs, because of the granularity issue, not only the bits involved in the actual write operation but all the bytes that belong to the memory regions involved in the update operation are affected by this problem. More particularly, this problem needs to be faced not only during a "Secure Update" but also during a non-secure update, hereinafter indicated as a "Non atomic update." In other words, it is not required that all the operations involved in such an update are considered as a single atomic operation.

With reference to FIG. 2a, a non-volatile memory 1 is schematically shown as comprising a plurality of memory portions R1, R2, R3, R4. During a "Secure Update" instruction, memory portions R1, R2, R3 and R4 are involved in a writing operation. Such writing operations affect, for example, persistent data stored in memory sub-regions R1b of the portion R1, memory regions R2 and R3, and memory sub-regions R4a of the portion R4.

The location containing persistent data to be updated is pointed by a "Start address" pointer and has a size equal to "Length". The transaction method needs to preserve the entire memory portions R1, R2, R3, R4 by storing all its content in a transaction stack, even if the writing operation does not affect the whole regions R1 and R4 but only the sub-regions R1b, R4a. Memory portions R1 and R4 need to be preserved completely because the writing operation requires an erase operation on them due to granularity issues.

FIG. 2b schematically shows the same non-volatile memory 1 wherein a "Non atomic Update" is performed. Also in this case memory portions R1, R2, R3, and R4 are involved in a non-atomic writing operation that affects persistent data stored in a location represented by memory sub-region R1b, memory regions R2 and R3, and memory sub-region R4a.

Also in this case the transaction method preserves memory portions R1 and R4 because sub-regions R1a and R4b not directly involved in the writing operation need to be preserved. In contrast, regions R2 and R3 are not preserved. In fact, while the value involved in the "Non atomic update" and stored in the non-volatile memory could be deliberately left in a partially modified state due to not belonging to a "Secure Update," it is not acceptable that the same happens for adjacent bits that do not have to be updated but are involved with the memory portions to be erased only because of granularity issues.

So, both "Secure Update" and "Non atomic update" operations would require a transaction method for preserving persistent data against possible unexpected events that occurred during update operations when determining an intensive use of the transaction stack.

The problem is that the lifetime of the non-volatile memory is limited due to writing operations on a transaction stack performed both during a "Secure Update" and also during a "Non atomic update" that stresses the transaction stack. This is especially so because the transaction stack needs to preserve a plurality of memory portions for the potential restoration of persistent data. This is not only during atomic updates but also during non-atomic updates that involve, for granularity issues, the erasing of persistent data that cannot be left in a non-consistent state.

SUMMARY OF THE INVENTION

In view of the foregoing background, an object is to provide a transaction method for preserving the lifetime of a transaction stack, and driving the storing of persistent data in such a stack so that the persistent data required to be restored after a possible power loss is preserved in the transaction stack, even if a "Non atomic update" is invoked.

This and other objects, advantages and features are provided by a transaction method for managing the storing of persistent data in a transaction stack comprising a plurality of transaction entries, during the execution of at least one update operation for updating at least a portion of the persistent data. The method may be included in at least one memory cell of a non-volatile memory device.

The method may provide the following operations, including a transaction activation for indicating that the update operation is going to be executed and persistent data is to be stored in the transaction stack. A push instruction may be for reading the persistent data from the memory cells, and for storing it in the transaction entries of the transaction stack. The push instruction may be executed after the transaction activation.

A pop instruction may be used for restoring the persistent data from the transaction entries to the memory cells when an unexpected event occurs after the transaction activation. A commit transaction instruction may be used for indicating that the update operation is completed and the transaction entries may be released.

The method may further comprise a push extreme instruction for reading from the memory cells only a remaining portion of the persistent data which is not involved in the update operation, and for storing the remaining portion in a subset of the transaction entries. The push extreme instruction may be executed instead of the push instruction when a restoring of the portion of persistent data is not required after the unexpected event. A discard instruction may be used for discarding only the subset of the transaction entries when the update operation is completed.

BRIEF DESCRIPTION OF THE DRAWINGS

The features and advantages of the invention will be apparent from the following description of an embodiment thereof, given by way of non-limitative examples with reference to the accompanying drawings.

FIG. 3b schematically shows a couple of adjacent memory portions of FIG. 2b involved in a "Non atomic update" procedure according to the present invention.

FIG. 3c schematically shows in more detail the memory portions of FIGS. 3a and 3b.

FIGS. 4a to 4q schematically show the content of Index, Address and Length buffers during the execution of [BeginTransaction and CommitTransaction] instructions according to the present invention.

FIG. 5 schematically shows the content of a non-volatile memory (Eep) and the content of Index, Address, Length and Backup Data buffers during a power loss according to the present invention.

DETAILED DESCRIPTION OF THE PREFERRED EMBODIMENTS

Figure 1:
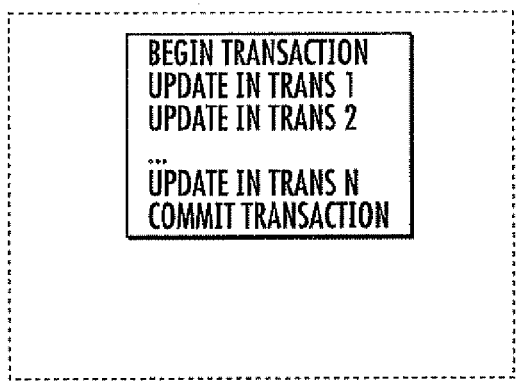
FIG. 1 schematically shows a couple of [BeginTransaction and CommitTransaction] instructions grouping a set of update operations according to the prior art.
Figure 2A:
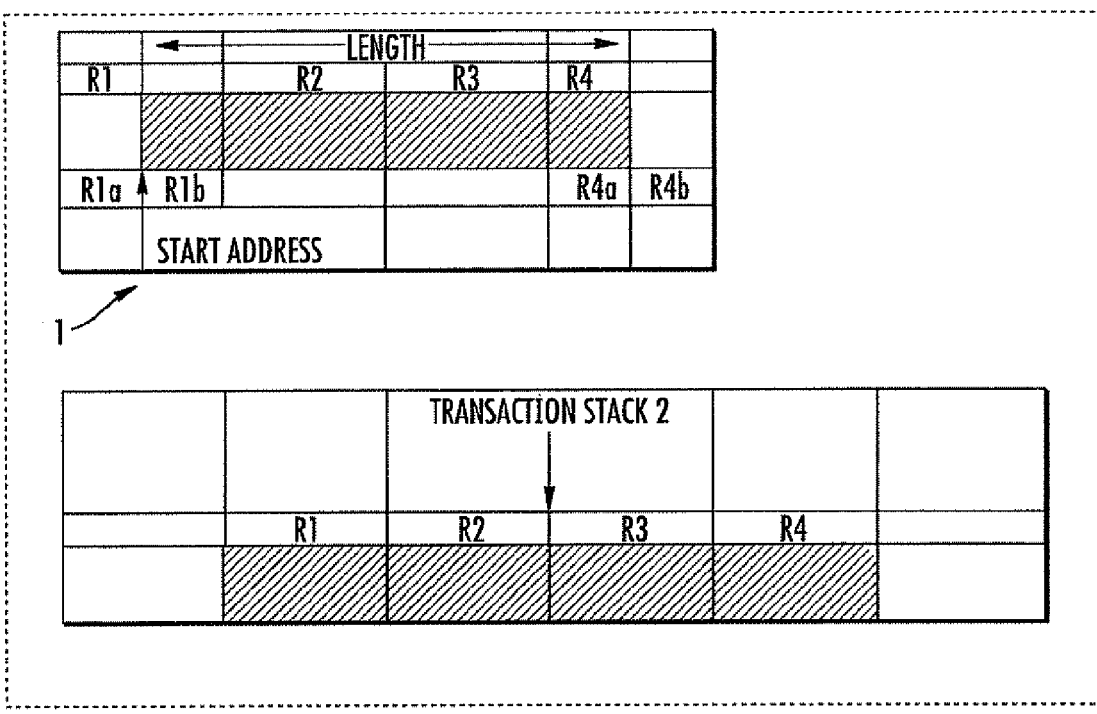
FIG. 2a schematically shows a couple of adjacent memory portions of a non-volatile memory device which are involved in a "Secure Update" procedure according to the prior art.
Figure 2B:
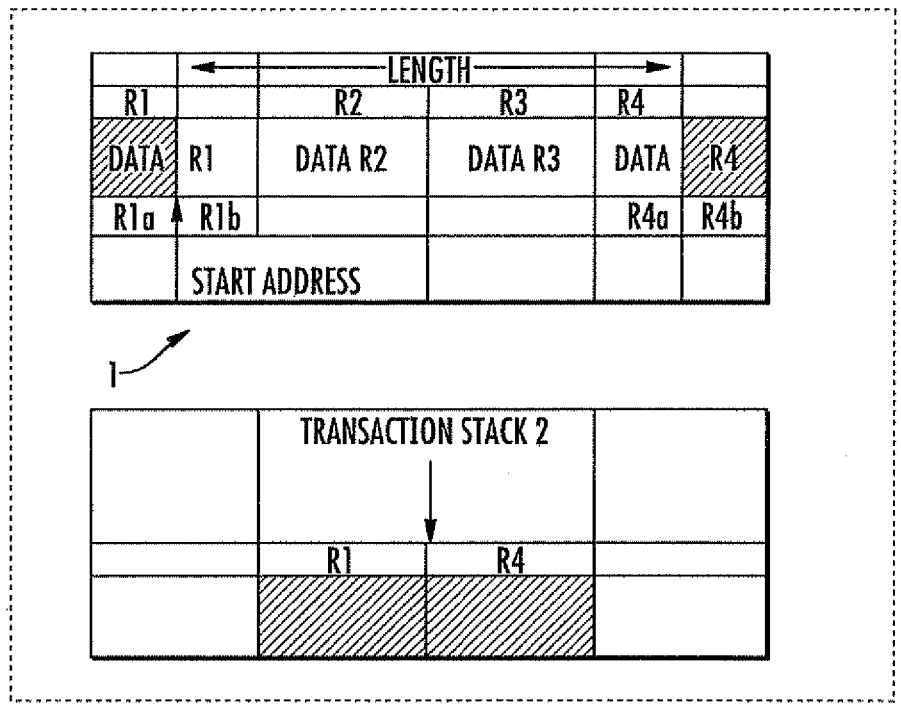
FIG. 2b schematically shows a couple of adjacent memory portions which are involved in a "Non atomic update" procedure according to prior the art.
Figure 3A:
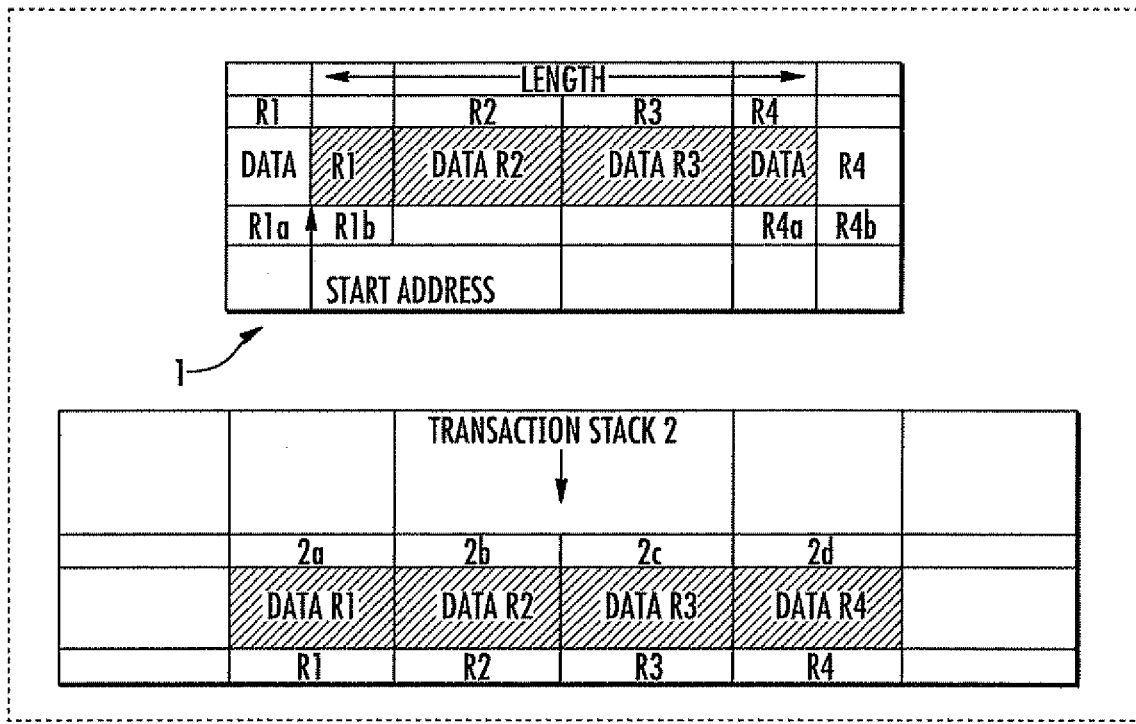
FIG. 3a schematically shows the couple of adjacent memory portions of FIG. 2a involved in a "Secure Update" procedure according to the present invention.

With more specific reference to FIG. 3a, a non-volatile memory device 1 comprises a plurality of memory portions R1-R4 that are provided for respectively storing persistent data data-R1 . . . data-R4. A transaction stack 2 comprises a plurality of transaction entries 2a-2d for storing the persistent data data-R1 . . . data-R4 during an update phase.

More particularly, as shown in more detail in FIG. 3a, the memory portion R1 of the non-volatile memory 1 comprises two sub-regions R1a and R1b, respectively including a first and a second group of persistent data data-R1a and data-R1b. Also, the memory portion R4 comprises two corresponding sub-regions R4a and R4b including a first and a second group of persistent data data-R4a, data-R4b.

An update operation may affect only a group of the persistent data, for example identified by memory sub-region data- R1b, memory regions data-R2, data-R3, and memory sub-region data-R4a. During the execution of such an update operation, a transaction method drives the storing of persistent data data-R1, data-R2, data-R3, data-R4 contained in the memory portions of R1, R2, R3, R4 in the transaction stack 2.

More particularly, the transaction method comprises a push instruction for reading the persistent data data-R1, data-R2, data-R3, data-R4 from the non-volatile memory 1 and storing them in one or more transaction entries of the transaction stack 2. For example, the data may be stored in transaction entries 2a, 2b, 2c and 2d. A pop instruction is used for reading the persistent data data-R1, data-R2, data-R3, data-R4 from the transaction entries 2a, 2b, 2c and 2d and for restoring them in the corresponding memory portions R1, R2, R3, R4 of the non-volatile memory 1. A begin transaction marker indicates that one or more update operations are starting. A commit transaction marker marks that one or more of the update operations has finished.

Figures 3B, 3C:
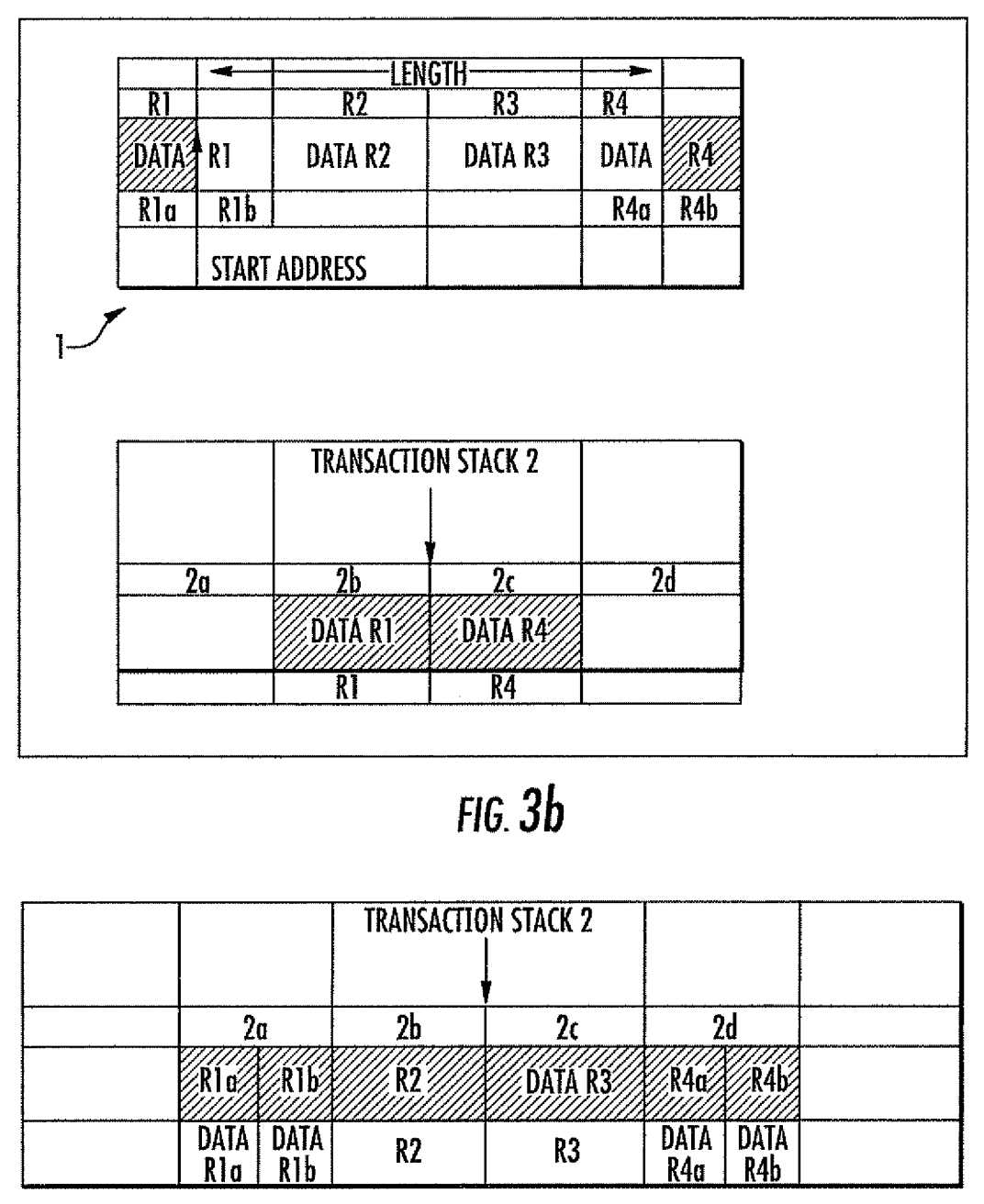

As schematically shown in FIG. 3b, the transaction method also comprises a push extreme instruction for reading one or more groups data-R1a, data-R4b of the persistent data data-R1, data-R4 from the non-volatile memory 1 and storing them in one or more transaction entries of the transaction stack 2. A discard instruction is for discarding from the transaction stack 2 only the transaction entries storing the previously stored one or more groups of data data-R1a, data-R4b.

The push extreme instruction advantageously requires a writing operation in the transaction stack 2 only for those groups of data that need to be preserved in case of unexpected events. For example, if a non atomic update is required on the group of data data-R1b, data-R2, data-R3, data-R4a, the group of data that needs to be preserved after a possible power loss is data-R1a, data-R4b, which are involved for granularity issues.

The push extreme instruction is invoked when a storing of a group of the persistent data data-R1b, data-R2, data-R3, data-R4a is not required in the transaction stack because their retrieving after a potential power loss is not required due to the nature of the update instruction. This is a non-atomic update.

In this way, the transaction stack 2 is less stressed by writing operations since it is not necessary to store the group of the persistent data data-R1b, data-R2, data-R3, data-R4a. More particularly, the transaction stack 2 comprises all the information needed to recover persistent data in the non-volatile memory in a consistent state. This includes not only the value of the persistent data inside the non-volatile memory 1, but also its address and size.

When a "Secure Update" requires the storing of original values in the transaction stack, the transaction method initializes a begin transaction marker for establishing that, in case of unexpected events or programmed aborts, only the entries stored after the begin transaction marker are used as original values of persistent data involved in the update operation.

Therefore, if a "Secure update", for example involving memory portions R1, R2, R3, R4 is requested, the transaction method calls a push instruction for storing inside the transaction stack 2 the information related to the memory portions R1, R2, R3, R4 since these memory regions are involved in the update operation.

When a "Non atomic update" is requested, the transaction method first checks if the transaction stack 2 is currently marked by a begin transaction marker, for example opened by a previously called secure update. If no marker was present, a new begin transaction marker is activated. Then, the transaction method calls a push extreme instruction to push inside the transaction stack 2 only the sub-regions that need to be protected during the anon atomic updates due to the granularity issue. Finally, the transaction method performs the actual update, discards the entries, and invalidates the begin transaction marker if it has been explicitly added for this "non atomic update".

As schematically shown in FIG. 3b, if a "Non atomic update" involves sub-region R1b, and regions R2 and R3, then sub-region R4a is requested. The transaction method only pushes the extreme group of data R1a, R4b in the transaction stack 2.

More particularly, the illustrated method offers the following set of functions.

Begin Transaction: open a new level of transactions in the transaction stack 2.

Push: preserve all the memory portions, for example R1, R2, R3, R4 involved in the update operation.

Push Extremes: preserve only extreme sub-regions R1a, R4b adjacent to the data involved in the erase-update operation.

Pop and Close Transaction: restore to the original value the memory updated by the last opened transaction and then close it.

Discard: invalidate the last record in the last opened transaction.

Discard and Close Transaction: invalidate the records relative to the last opened transaction and then close it.

The transaction stack 2 advantageously comprises four buffers: Backup Data, Address, Length, and Index. The transaction stack ensures a circular use of the four buffers so to maximize the lifetime of the corresponding non-volatile memory stressing uniformly their memory cell.

The Backup Data buffer comprises a plurality of aligned backup entries a length of which is a multiple of the granularity of the non-volatile memory 1, so that the updating of a single backup entry does not require the erasing of adjacent backup entries. More particularly, the Backup Data buffer contains the original value of the persistent memory to be restored in case of an abort during an update operation. The portion of the entry that needs to be restored is identified by Address-Length entries as will be explained below.

The Index buffer comprises a plurality of index entries and link Address-Length entries in the Address-Length buffers to Backup Data entries in the Backup Data buffer. More particularly, the Index buffer provides that the same Backup Data entry can be related to more update operations, ensuring the reuse of the Backup data buffer. A Backup data entry is advantageously conserved because it may be reused in a same transaction without additional re-writing that limits the lifetime of a non-volatile memory 1.

To extend the lifetime of a non-volatile memory 1, it is important to ensure the circularity in all four buffers. Since the Index, Address and Length buffers are substantially aligned, their circularity is ensured by markers in the Index buffer. These markers allow tracking of the last used entry in the Index buffer, and consequently, the last used entry in the Address and Length buffers.

Circularity of the Backup buffer, instead, is an ensured savings in the Index buffer that is the last used position of the Backup buffer. Moreover, before closing a Root Transaction the last position used is also saved. This means that when a Nested Transaction is closed, it releases Backup entries to the previous Transaction opened. This may be a Root Transaction or a Nested Transaction, since multilevel transactions are possible.

Unlike the update of the Backup entries, update of the Index, Address, Length entries needs to take into account the memory granularity since the length of a single entry cannot be a multiple of the granularity. This is to avoid wasting memory space.

The size of the Index, Address, and Length buffers is always a multiple of the memory granularity, so that the Index, Address and Length buffers are composed of an integer number of granularity pages. Each page can be completely erased without touching the rest of the buffer.

More particularly, when an index value needs to be written in an index entry within an Index page, two cases can be distinguished: the index entry is available for the writing, for example because it has been already erased; and the index entry is not available for the writing, for example because the index entry is not erased.

In the first case, no erase operation is needed but only a simple write operation shall be performed to store the new index value. In the second case, if possible, the whole Index page and the corresponding Address and Length pages shall be erased to make them available for writing.

The functions offered by the transaction method are listed and described in more detail below:

Begin Transaction: open a new level of transaction. To extend the lifetime of the non-volatile memory 1, global-pointers in the non-volatile memory 1 cannot be used for defining the beginning of the level. So marker elements are introduced in the Index buffer.

Discard: Invalidate the last record in the last transaction opened. Before discarding an entry, the previous entry related to the same memory-block is searched. If a previous entry exist it is marked to remember that a "Non atomic update" has happened on the same non-volatile memory portion. The Discard operation simply reports to the NOT ERASED state of the index entry.

Push: Add a new record in the transaction stack 2 in the last opened transaction. If the block requested is not available in the Backup Data buffer it is stored. Otherwise, it is stored again only if the "Non atomic update" has happened on the non-volatile memory portion. However, it is not stored in the Backup Data buffer, for example because a discard operation has been invoked.

The writings are executed in this order: Backup Buffer (if required), Address, Length and Index, for validation marker purposes.

Push Extremes: the same step of the Push operation but in the Length entry the most significant bit is set to 1 to track that the Push operation is related to the extreme zone, and not to the internal zone defined by the Address and Length.

Pop and Close Transaction: mark the Index buffer with a POP marker to remember that a Pop Transaction operation is in progress. This is in case of a power-loss. If a Root Transaction, calculate and store the last index used for ensuring the circularity in the Backup Data buffer. Check if the entry to restore has been marked by a discard operation invoke. For example, a "Non atomic update" has happened but it is not stored in the Backup buffer entry. In this case, for saving the "Non atomic update", a snapshot of the block is stored in the first free entry of the Backup buffer. Otherwise, the last consistent state of the entry is already contained in the Backup Data buffer.

Discard the entry restored: the restoring process searches entries related to the same memory region for optimizing the number of update operations. At the end of the process, the BEGIN marker is invalidated, for example because the corresponding index entry is set to NOT ERASED state.

Discard and Close Transaction: mark the index buffer with a COMMIT marker to remember that a Discard Transaction operation is in course, in case of a power-loss. If a Root Transaction, then calculate and store the last index used for ensuring the circularity in the Backup Data buffer. Iterate the Discard operation for all the transactions. At the end of the process, the BEGIN marker is invalidated, for example the corresponding index entry is set to a NOT ERASED state.

Assuming that the non persistent memory granularity is 4-bytes, erased element is 0x00 and the not erased element is 0xFF, then the transaction method may provide:

a Backup Entry size of 64 bytes, an Index, Length entry size of 1 byte and an Address entry size of 4 bytes;

an Index Page size of 4 bytes, the minimum value for allowing a safe page erasing;

a Length Page size of 4 bytes long to ensure correspondence with the Index Pages;

an Address Page size of 4*4 bytes to ensure correspondence with the Index Pages.

The core of the transaction method takes place in Index Buffer, which is represented with the Address and Length buffers in FIGS. 4a-4q as an example of execution of an update operation.

More particularly, the following features of the transaction method should be noted:

In FIG. 4f, since the memory region 0x910000 is already stored in the Backup Data buffer, the entry may be reused without additional erase-rewriting operations.

In FIG. 4g, a new block is requested and so the next free entry of the Backup Buffer is used. In FIG. 4i, a marker COMMIT ROOT is written to track that the transaction needs to be discarded in case of a power-loss.

In FIG. 4j, the last index used by the transaction that needs to be closed is searched and stored. In FIG. 4k, some entries are discarded. In FIG. 4l, the BEGIN ROOT marker is invalidated, for example because the transaction is closed. In FIG. 4n, the COMMIT ROOT marker is invalidated (the marker BEGIN ROOT defines the semantics of the OLD_LAST value).

In FIG. 4o, the next index that needs to be used for ensuring circularity in the Backup Buffer is "OLD_LAST +1". Finally, in FIG. 4p, the first Index Page is not available for the writing since its entries are discarded (i.e., set to the value NOT ERASED). So a preliminary erasing operation is necessary to free the Index, Address and Length entries.

In FIG. 5, the Address, Index, Length and Backup Buffers are represented. A sequence of update operations is requested on the non-volatile memory 1 that is represented in an initial state (EEP data initial state)". During the performing of the last update listed in the sequence, a power loss occurs.

The restoring of the memory region 0x91010 according to the illustrated method comprises the following steps:

1) copy in a temporary memory vector of a volatile memory RAM the last consistent state of the memory region 0x91010. Since no "Non atomic update" has happened after the last update on memory block 0x91010, it is the last consistent state contained in the Backup buffer entry 3.

Memory Vector←[1 1 3 8 8 8 8 8 8 8 8 2 2 2 2]

2) restore to the old-value the memory regions involved in the secure updates.

Memory Vector←[1 1 3 8 8 8 8 8 8 8 8 8 8 8 8]
Memory Vector←[8 8 3 8 8 8 8 8 8 8 8 8 8 8 8]

3) Real restoring operation in the non-volatile memory 1 of the memory region 0x91010. Note that since "Non-atomic update" does not participate in the transaction, the related zone is not restored to the original value.

The main steps of the method for managing the storing of persistent data are briefly resumed below. The persistent data data-R1, data-R2, data-R3, data-R4 are stored in one or more memory portions or cells R1, R2, R3, R4 of the non-volatile memory 1 device having a predetermined granularity. One or more update operations op1, op2 access at least a portion data-R1b, data-R2, data-R3, data-R4a of the persistent data data-R1, data-R2, data-R3, data-R4 for update.

In some cases, for example depending on the type of update operations, the portions data-R1b, data-R2, data-R3, data-R4a of the persistent data need to be stored in a transaction stack because they need to be restored in the memory cells if an unexpected event occurs during the update operation.

In other cases, it is not required that the portions data-R1b, data-R2, data-R3, data-R4a of persistent data are stored in the transaction stack because it is not required that such portions are restored in the memory cells after the unexpected event. It worth noting that, even if it is not required that the portions data-R1b, data-R2, data-R3, data-R4a of persistent data be stored in the transaction stack, remaining portions data-R1a, data-R4b of the persistent data need to be stored therein for granularity issues.

In fact, even if the update operation op1, op2 does not update a value of the remaining portions data-R1a, data-R4b, it involves an erase operation and a subsequent write operation on the memory cells R1, R2, R3, R4 including the remaining portions data-R1a, data-R4b.

The method provides the following operations for storing persistent data in a transaction stack 2 comprising a plurality of transaction entries 2a, 2b, 2c, 2d.

Transaction activation, for indicating that the update operation op1, op2 is going to be executed and persistent data data-R1, data-R2, data-R3, data-R4 is to be stored in the transaction stack 2.

Push instruction, for reading the persistent data data-R1, data-R2, data-R3, data-R4 from the memory cells R1, R2, R3, R4 and for storing it in the transaction entries 2a, 2b, 2c, 2d of the transaction stack 2. More particularly, the push instruction is executed after the transaction activation.

Pop instruction, for restoring the persistent data data-R1, data-R2, data-R3, data-R4 from the transaction entries 2a, 2b, 2c, 2d to the memory cells R1, R2, R3, R4 when an unexpected event occurs after the transaction activation.

Commit transaction instruction, for indicating that the update operation op1, op2 is completed and the transaction entries 2a, 2b, 2c, 2d are releasable.

According to the invention, the method further comprises a push extreme instruction for reading from the memory cells R1, R2, R3, R4 only remaining portions data-R1a, data-R4b of the persistent data data-R1, data-R2, data-R3, data-R4 which are not involved in the update operation op1, op2. The push extreme instruction provides for storing the remaining portions data-R1a, data-R4b in a subset 2b, 2c of the transaction entries 2a, 2b, 2c, 2d. More particularly, the push extreme instruction is executed, instead of the push instruction, when restoring the portions data-R1b, data-R2, data-R3, data-R4a of persistent data is not required after the unexpected event. In fact, even if the portions data-R1b, data-R2, data-R3, data-R4a are left in a nonconsistent state, the remaining portions data-R1a, data-R4b of persistent data could include important information that is to be restored in the memory. A discard instruction is for discarding only the remaining portions data-R1a, data-R4b stored in the subset 2b, 2c of the transaction entries when the update operation is completed.

The push extreme and the discard instruction advantageously avoid stressing the transaction stack with writing and erasing operations because it limits such writing and erasing operations on a subset of transaction entries, that is, the subset required to store the remaining portions data-R1a, data-R4b.

The transaction method advantageously optimizes the number of update operations in the non-volatile memory since the memory regions to be restored are first calculated in a memory vector of volatile memory and then written in the non-volatile memory.

The lifetime of the non-volatile memory is advantageously extended because the writing operations on the transaction stack are performed only to store those sub-memory regions containing data that need to be restored in case of unexpected events. This is while no writing operations on the transaction stack are performed to preserve data that do not require a consistent state after the unexpected events.

The transaction method further extends the lifetime of the transaction stack by reusing the persistent data stored therein, and checking if persistent data that should be stored. This is because memory regions involved in the update operations are already stored in the transaction stack due to a previously executed update operation.

The lifetime of the non-volatile memory is also advantageously extended when it is to be restored after unexpected events. This is because the consistent state of the non-volatile memory is previously reconstructed in the volatile memory RAM, and then restored in the non-volatile memory through a single write operation.

That which is claimed:

1. A method for managing the storing of persistent data in at least one memory cell of a non-volatile memory device, inside a transaction stack comprising a plurality of transaction entries, during the performance of at least one update operation for updating at least a portion of the persistent data, the method comprising:

performing a transaction activation to indicate that the at least one update operation is going to be executed and that the persistent data is to be stored in the transaction stack;

performing a push instruction to read the persistent data from the at least one memory cell and to store the persistent data in the plurality of transaction entries, the push instruction being performed after the performance of the transaction activation;

performing a pop instruction to restore the persistent data from the plurality of transaction entries to the at least one memory cell when an unexpected event occurs after performing the transaction activation;

performing a commit transaction instruction to indicate that the at least one update operation has been performed and that the plurality of transaction entries are releasable;

performing a push extreme instruction to read a remaining portion of the persistent data which is not involved in the at least one update operation from the at least one memory cell and to store the remaining portion in a subset of the plurality of transaction entries, the push extreme instruction being performed instead of the push instruction when a restoration of the remaining portion of persistent data as not required after the unexpected event; and performing a discard instruction to discard the remaining portion stored in the subset when the at least one update operation is completed.

2. A method according to claim 1, wherein the at least one update operation does not update the remaining portion of the persistent data.

3. A method according to claim 1, wherein the push instruction is performed by storing the persistent data in the plurality of transaction entries only if the persistent data is not already stored in the plurality of transaction entries due to a previous performance of the at least one update operation.

4. A method according to claim 1, wherein the push extreme instruction is performed by storing the remaining portion in the subset only if the remaining portion is not already stored in the subset due to a previous execution of the at least one update operation.

5. A method according to claim 1, wherein performing the discard instruction comprises checking whether the remaining portion is already stored in an entry of the subset and marking the entry if the remaining portion is stored in an entry of the subset, before discarding the remaining portion.

6. A method according to claim 5, wherein the transaction stack comprises a plurality of buffers that include a plurality of corresponding entries.

7. A method according to claim 6, wherein the plurality of buffers define a backup data buffer, the backup data buffer comprising a plurality of backup data entries storing a plurality of values of the persistent data.

8. A method according to claim 7, wherein the backup data entries have a length which is a multiple of a granularity of the non-volatile memory.

9. A method according to claim 8, wherein the plurality of buffers further define an address buffer, the address buffer comprising a plurality of address entries storing a plurality of addresses of the persistent data.

10. A method according to claim 9, wherein the plurality of buffers further define a length buffer, the length buffer comprising a plurality of length entries storing a plurality of lengths of the persistent data.

11. A method according to claim 10, wherein the plurality of buffers further define an index buffer, the index buffer comprising a plurality of index entries storing a plurality of indexes for linking the address and length buffers entries to the backup data entries.

12. A method according to claim 11, wherein the index buffer links a backup data entry to at least one update operation, allowing the reuse of the backup data buffer.

13. A method according to claim 12, wherein performing the discard instruction further comprises marking the index entry as NOT ERASED.

14. A method according to claim 13, wherein the index entry is written in the index page if it is in a ready to be written state.

15. A method according to claim 14, wherein the index page is erased if the index entry is not in the ready to be written state and a writing operation is required on the index entry.

16. A method according to claim 15, wherein the corresponding plurality of entries inside the plurality of buffers are written in a circular way, writing in order a first entry, a plurality of following entries, and restarting from the first entry when a last entry is reached.

17. A method according to claim 16, wherein performing a transaction activation further comprises performing at least one additional transaction activation to execute a nested plurality of the at least one update operation.

18. A method according to claim 17, wherein the last used position of the backup buffer is stored inside the index buffer.

19. A method according to claim 1, wherein the pop instruction is performed by copying the last consistent value from the plurality of transaction entries to a temporary memory vector of a volatile memory RAM and copying the temporary memory vector to the at least one memory cell.

20. A method for managing the storing of persistent data in at least one memory cell of a non-volatile memory device, inside a transaction stack comprising a plurality of transaction entries, during the performance of at least one update operation for updating at least a portion of the persistent data, the method comprising:

performing a transaction activation to indicate that the at least one update operation is going to be executed and that the persistent data is to be stored in the transaction stack;

performing a push instruction to read the persistent data from the at least one memory cell and to store the persistent data in the plurality of transaction entries, the push instruction being performed after the performance of the transaction activation and being performed by storing the persistent data in the plurality of transaction entries only if the persistent data is not already stored in the plurality of transaction entries due to a previous performance of the at least one update operation;

performing a pop instruction to restore the persistent data from the plurality of transaction entries to the at least one memory cell when an unexpected event occurs after performing the transaction activation;

performing a commit transaction instruction to indicate that the at least one update operation has been performed and that the plurality of transaction entries are releasable;

performing a push extreme instruction to read a remaining portion of the persistent data which is not involved in the at least one update operation from the at least one memory cell and to store the remaining portion in a subset of the plurality of transaction entries, the push extreme instruction being performed instead of the push instruction when a restoration of the remaining portion of persistent data is not required after the unexpected event and being performed by storing the remaining portion in the subset only if the remaining portion is not already stored in the subset due to a previous execution of the at least one update operation; and performing a discard instruction to discard the remaining portion stored in the subset when the at least one update operation is completed.

21. A method according to claim 20, wherein the at least one update operation does not update the remaining portion of the persistent data.

22. A method according to claim 20, wherein performing the discard instruction comprises checking whether the remaining portion is already stored in an entry of the subset and marking the entry if the remaining portion is stored in an entry of the subset, before discarding the remaining portion.

23. A method according to claim 20, wherein the pop instruction is performed by copying the last consistent value from the plurality of transaction entries to a temporary memory vector of a volatile memory RAM and copying the temporary memory vector to the at least one memory cell.

24. An electronic device comprising:
a non-volatile memory including at least one memory cell; and
a processor coupled to said non-volatile memory for managing storing of persistent data by at least
performing a transaction activation to indicate that the at least one update operation is going to be executed and that the persistent data is to be stored in a transaction stack,
performing a push instruction to read the persistent data from the at least one memory cell and to store the persistent data in a plurality of transaction entries of the transaction stack, the push instruction being performed after the performance of the transaction activation, performing a pop instruction to restore the persistent data from the plurality of transaction entries to the at least one memory cell when an unexpected event occurs after performing the transaction activation, performing a commit transaction instruction to indicate that the at least one update operation has been performed and that the plurality of transaction entries are releasable, performing a push extreme instruction to read a remaining portion of the persistent data which is not involved in the at least one update operation from the at least one memory cell and to store the remaining portion in a subset of the plurality of transaction entries, the push extreme instruction being performed instead of the push instruction when a restoration of the remaining portion of persistent data is not required after the unexpected event, and performing a discard instruction to discard the remaining portion stored in the subset when the at least one update operation is completed.

25. The electronic device of claim 24, wherein the processor is configured to not update the remaining portion of the persistent data while performing the at least one update operation.

26. The electronic device of claim 24, wherein said processor is configured to perform the push instruction by storing the persistent data in the plurality of transaction entries only if the persistent data is not already stored in the plurality of transaction entries due to a previous performance of the at least one update operation.

27. The electronic device of claim 24, wherein said processor is configured to perform the push extreme instruction by storing the remaining portion in the subset only if the remaining portion is not already stored in the subset due to a previous execution of the at least one update operation.

28. The electronic device of claim 24, wherein said processor is configured to perform the discard instruction by checking whether the remaining portion is already stored in an entry of the subset and marking the entry if the remaining portion is stored in an entry of the subset, before discarding the remaining portion.

* * * * *

UNITED STATES PATENT AND TRADEMARK OFFICE
CERTIFICATE OF CORRECTION

PATENT NO. : 7,694,094 B2  Page 1 of 1
APPLICATION NO. : 11/771307
DATED : April 6, 2010
INVENTOR(S) : Sepe et al.

It is certified that error appears in the above-identified patent and that said Letters Patent is hereby corrected as shown below:

| | |
|---|---|
| Column 7, Line 30 | Delete: "exist" <br> Insert: --exists-- |
| Column 9, Line 14 | Delete: "worth" <br> Insert: --is worth-- |
| Column 10, Line 15 | Delete: "that" |
| Column 10, Line 57 | Delete: "as" <br> Insert: --is-- |

Signed and Sealed this

Seventh Day of September, 2010

David J. Kappos
*Director of the United States Patent and Trademark Office*